(12) United States Patent
Hayakawa et al.

(10) Patent No.: US 7,630,170 B2
(45) Date of Patent: Dec. 8, 2009

(54) SEALING METHOD FOR MAGNETIC DISK DRIVE

(75) Inventors: Takako Hayakawa, Kanagawa (JP); Kouki Uefune, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 429 days.

(21) Appl. No.: 11/499,480

(22) Filed: Aug. 3, 2006

(65) Prior Publication Data

US 2007/0035872 A1 Feb. 15, 2007

(30) Foreign Application Priority Data

Aug. 9, 2005 (JP) .............................. 2005-230920

(51) Int. Cl.
*G11B 33/14* (2006.01)
(52) U.S. Cl. ................................ 360/97.02; 360/97.01
(58) Field of Classification Search ............. 360/97.01, 360/97.02; 720/648; 312/334.6; 206/713, 206/714, 496
See application file for complete search history.

(56) References Cited

U.S. PATENT DOCUMENTS 5,021,905 A * 6/1991 Sleger .................... 360/97.02

6,631,049 B2 * 10/2003 Satoh et al. ............... 360/97.02
2003/0179489 A1 * 9/2003 Bernett et al. ............ 360/97.01

FOREIGN PATENT DOCUMENTS

| CN | 2736891 | 10/2005 |
|----|---------|---------|
| JP | 07-073658 | 3/1995 |
| JP | 09-326192 | 12/1997 |
| JP | 2004-037707 | 2/2004 |

OTHER PUBLICATIONS

The State Intellectual Property Office of the People's Republic of China, Office Action for Application No. 200610110140.X, dated Jan. 16, 2009, 9 pages total.

* cited by examiner

*Primary Examiner*—Andrea L Wellington
*Assistant Examiner*—Gustavo Polo
(74) *Attorney, Agent, or Firm*—Townsend and Townsend and Crew LLP; Patrick Duncan

(57) ABSTRACT

A magnetic disk drive is to be provided which not only can promote the reduction of size thereof but also maintain a state in which outside air does not directly enter the interior of a case. In one embodiment, a magnetic disk drive comprises a base member, the base member having an upper surface at least a part of which is open to receive therein a magnetic disk assembly, a plate-like cover member for covering the magnetic disk assembly received within the base member, and a sheet-like sealing member affixed to an upper surface of the cover member and upper and side faces of the base member to seal a clearance between the base member and the cover member.

13 Claims, 7 Drawing Sheets

SEALING METHOD FOR MAGNETIC DISK DRIVE

CROSS-REFERENCES TO RELATED APPLICATIONS

This application claims priority from Japanese Patent Application No. JP2005-230920, filed Aug. 9, 2005, the entire disclosure of which is incorporated herein by reference.

BACKGROUND OF THE INVENTION

The present invention relates to a small-sized, thin, magnetic disk drive and, more particularly, to a sealing method therefor.

A magnetic disk drive such as a hard disk drive is constructed such that a magnetic head is allowed to fly over a rotating magnetic disk medium and, with the use of the magnetic head, read and write of data are performed with respect to the magnetic disk medium. Generally, the smaller the flying height between the magnetic head and the magnetic disk medium, the higher the recording density. With the recent demand for increase of capacity or both increase of capacity and reduction of size, the flying height is becoming smaller for the improvement of recording density.

Therefore, it is necessary that a case which houses therein a magnetic disk assembly such as a hard disk assembly (HDA), etc. be partitioned from the exterior lest particles larger than the flying height such as dust suspended within the case should enter the case.

Heretofore, the following methods has been adopted to meet this requirement: a method wherein a clearance between a cover member and a base member both constituting the case is sealed with a gasket or a method wherein the clearance is sealed using a ribbon- or sheet-like sealing member. For example, FIG. 7 shows a magnetic disk drive wherein a clearance between a base member 30 and a cover member 31 both constituting a case is sealed using a ribbon-like sealing member. FIG. 8 is a sectional view taken on line A-A in FIG. 7.

A peripheral edge portion 30a of an opening of the base member 30 is formed so as to be fitted in the cover member 31, whereby the base member 30 is fitted in the cover member 31. A clearance between the base member 30 and the cover member 31 is sealed by winding a ribbon-like sealing member 32 around the outer peripheries of both the base member and the cover member. The outer periphery of the periphery edge portion 30a of the opening is smaller by a width of d than the outer periphery of the bottom of the base member 30 to permit the cover member 31 to be fitted on the base member 30. The magnetic disk drive also includes a width of f of the sealing member 32.

Another case sealing method is shown in FIG. 9. According the method, a flange is formed on the peripheral edge portion of the opening of the base member, a plate-like cover member is disposed so as to cover the opening of the base member, and a sheet-like sealing member 32 is affixed to the cover member to cover the cover member and seal the clearance between the flange and the cover member. Also when this sealing method is used, the height of the magnetic disk drive includes the thickness of the sealing member.

BRIEF SUMMARY OF THE INVENTION

According to the above conventional sealing methods, however, for example in case of using a ribbon-like sealing member, the bottom of the base member 30 is formed wider than the outer periphery of the peripheral edge portion 30a of the opening, thus resulting in an increase of size as compared with the housing capacity of the base member 30. If the magnetic disk drive is further reduced in size and thickness, the area which permits affixing of the sealing member becomes narrower to such an extent that the affixing of the sealing member may become difficult. In the example where a flange is formed, the case of the magnetic disk drive becomes larger by an amount corresponding to the size of the flange.

That is, with the reduction of size and thickness of the magnetic disk drive, the magnetic disk drive becomes smaller in width (w), height (h) and thickness in FIG. 8, so that it becomes difficult to ensure a width L which is necessary for ensuring sealability. Further, with a decrease of size, it becomes difficult to ensure a sufficient strength of the sideways portion of the case.

The present invention has been accomplished in view of the above-mentioned problems and it is a feature of the present invention to provide a magnetic disk drive which not only can promote the reduction of size thereof but also maintain a state in which outside air does not directly enter the interior of a case.

According to an aspect of the present invention, a magnetic disk drive comprises a base member having an upper surface at least a part of which is open, a spindle motor installed on the base member, a single or a plurality of magnetic disks for recording information, the magnetic disk(s) being driven rotationally by the spindle motor, a magnetic head adapted to write and read information with respect to the magnetic disk, a magnetic head assembly adapted to perform positioning of the magnetic head, and a cover member fixed to the base member to form a space for accommodating the spindle motor, the magnetic disk, the magnetic head and the magnetic head assembly, wherein a sheet-like sealing member is affixed to an upper surface of the cover member and to side faces of the base member to seal a clearance between the base member and the cover member.

DETAILED DESCRIPTION OF THE INVENTION

Figure 1:
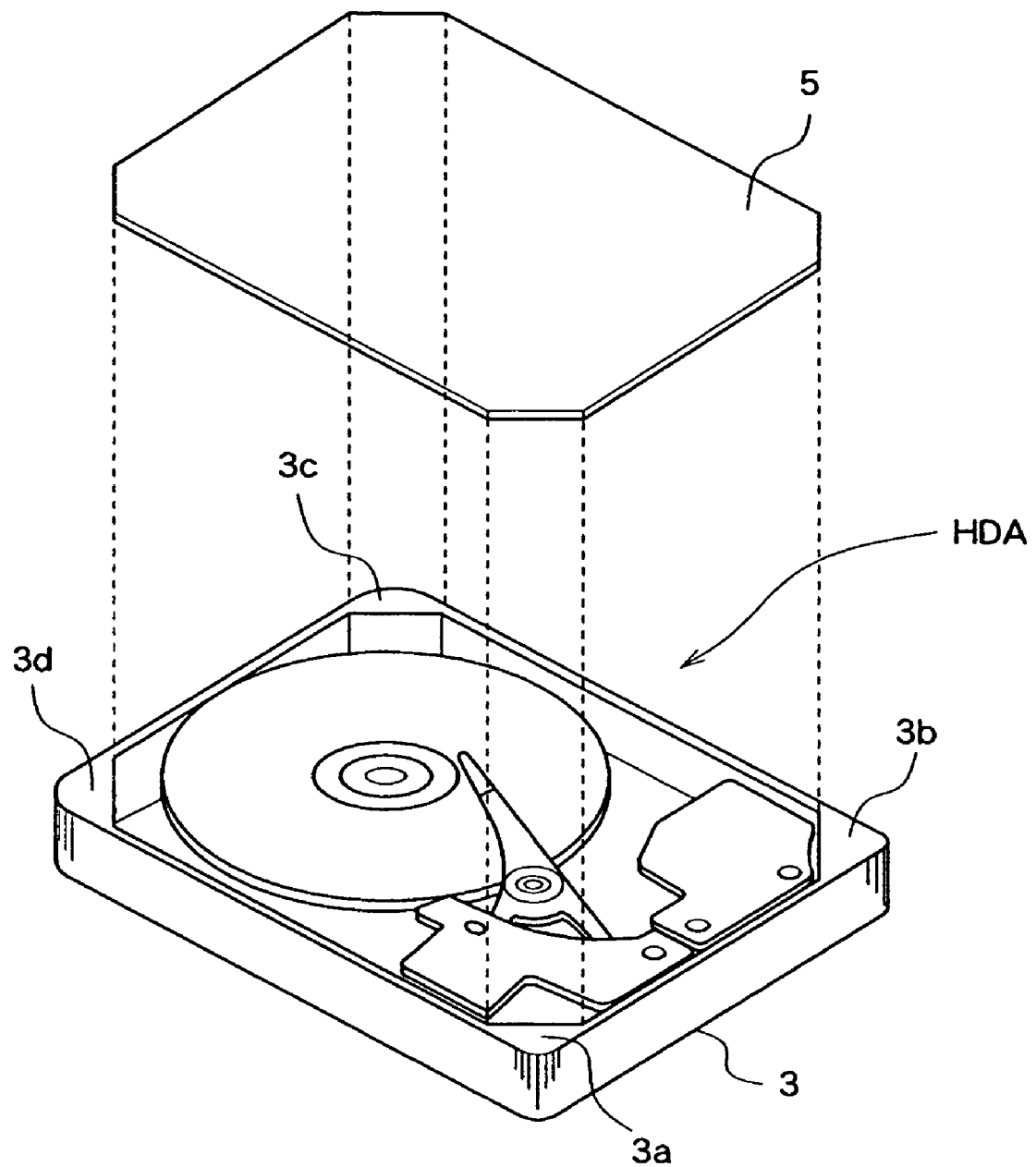
FIG. 1 is a perspective view showing the structure of a magnetic disk drive according to an embodiment of the present invention.

A magnetic disk drive according to an embodiment of the present invention will be described with reference to the drawings. As shown in FIG. 1, a magnetic disk drive 1 embodying the present invention includes a box-like base member 3 having an upper surface at least a part of which is open and a plate-like cover member 5 to cover a magnetic or hard disk assembly HDA which is accommodated in the base member 3.

The base member 3 is in a rectangular shape having round corners in plan view and at the four corners of the base member there are formed support portions 3a, 3b, 3c and 3d toward the inside of the opening of the base member to support the cover member 5. The cover member 5 is placed on those support portions. A magnetic disk assembly HDA is accommodated in the base member 3 and is covered with the cover member 5.

Figure 2:
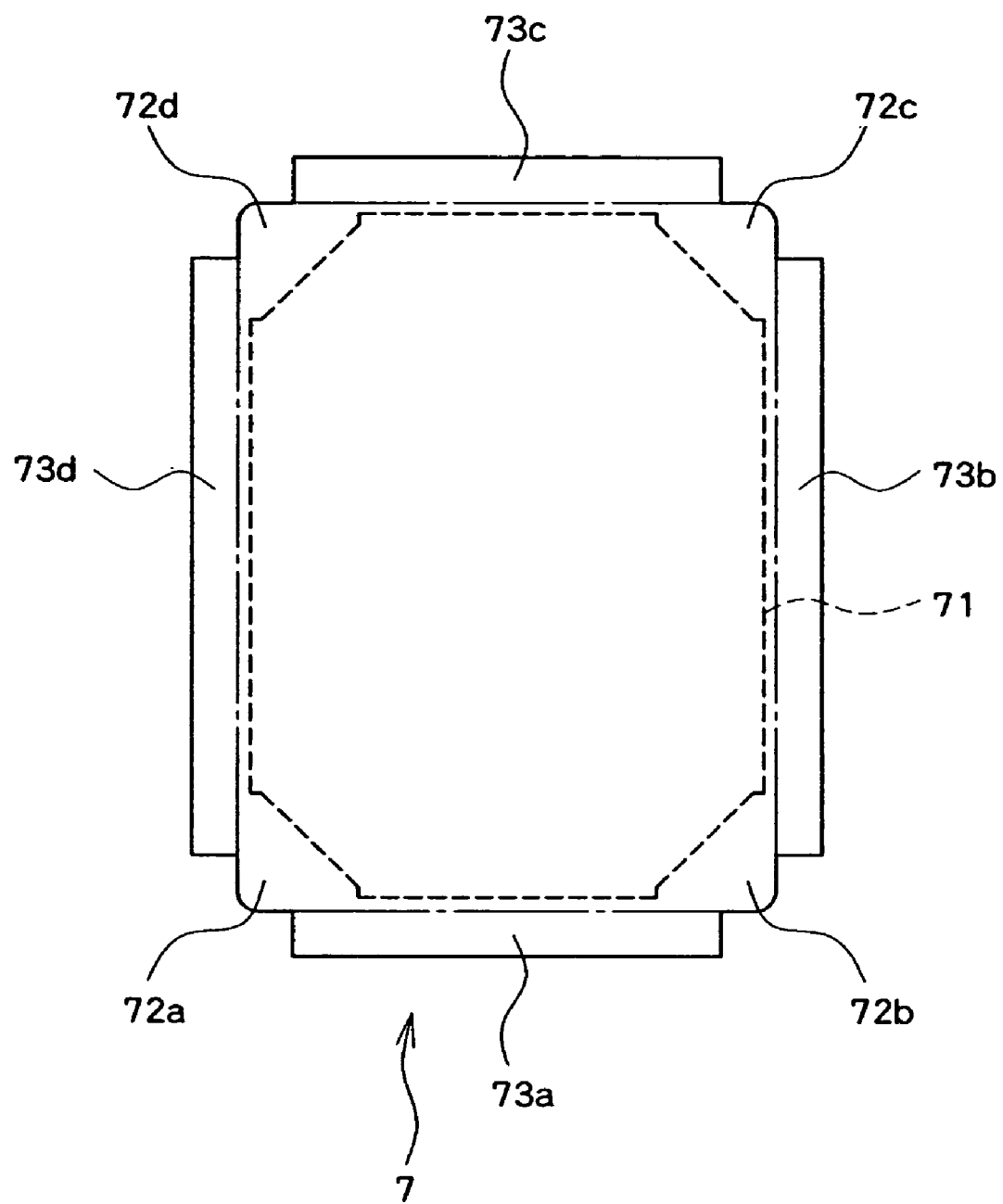
FIG. 2 is a plan view showing an example of a sealing member used in the magnetic disk drive of FIG. 1.

In this embodiment, a sheet-like sealing member 7 is affixed to at least a part of outer side faces of the base member 3 and also to an upper surface of the cover member 5 to seal a clearance between the base member 3 and the cover member 5. For example, as shown in plan view in FIG. 2, the sealing member 7 is in a rectangular shape having round corners to match the shape of the upper surface of the base member 3. The sealing member 7 includes a cover affixing portion 71 to be affixed to the cover member 5, support portion affixing portions 72a, 72b, 72c and 72d to be affixed respectively to the support portions 3a, 3b, 3c, and 3d at the four corners of the base member 3, and side face affixing portions 73a, 73b, 73c and 73d to be bent and affixed to the four outer side faces of the base member 3. In FIG. 2, the shape of the cover member 5 is indicated by a broken line.

Figure 3:
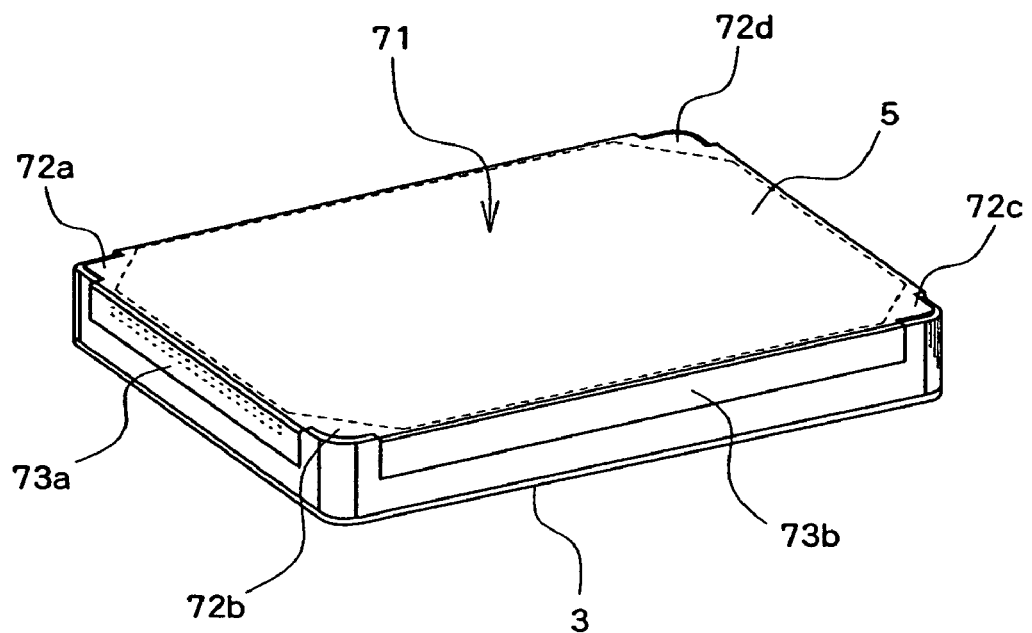
FIG. 3 is a perspective view of the magnetic disk drive of FIG. 1.

In the magnetic disk drive of this embodiment, as shown in a perspective view thereof in FIG. 3, the opening of the base member 3 is covered with the plate-like cover member 5 and sealing is made from the upper surface of the cover member 5 up to the side faces of the base member 3 by means of the sheet-like sealing member 7.

Figure 8:
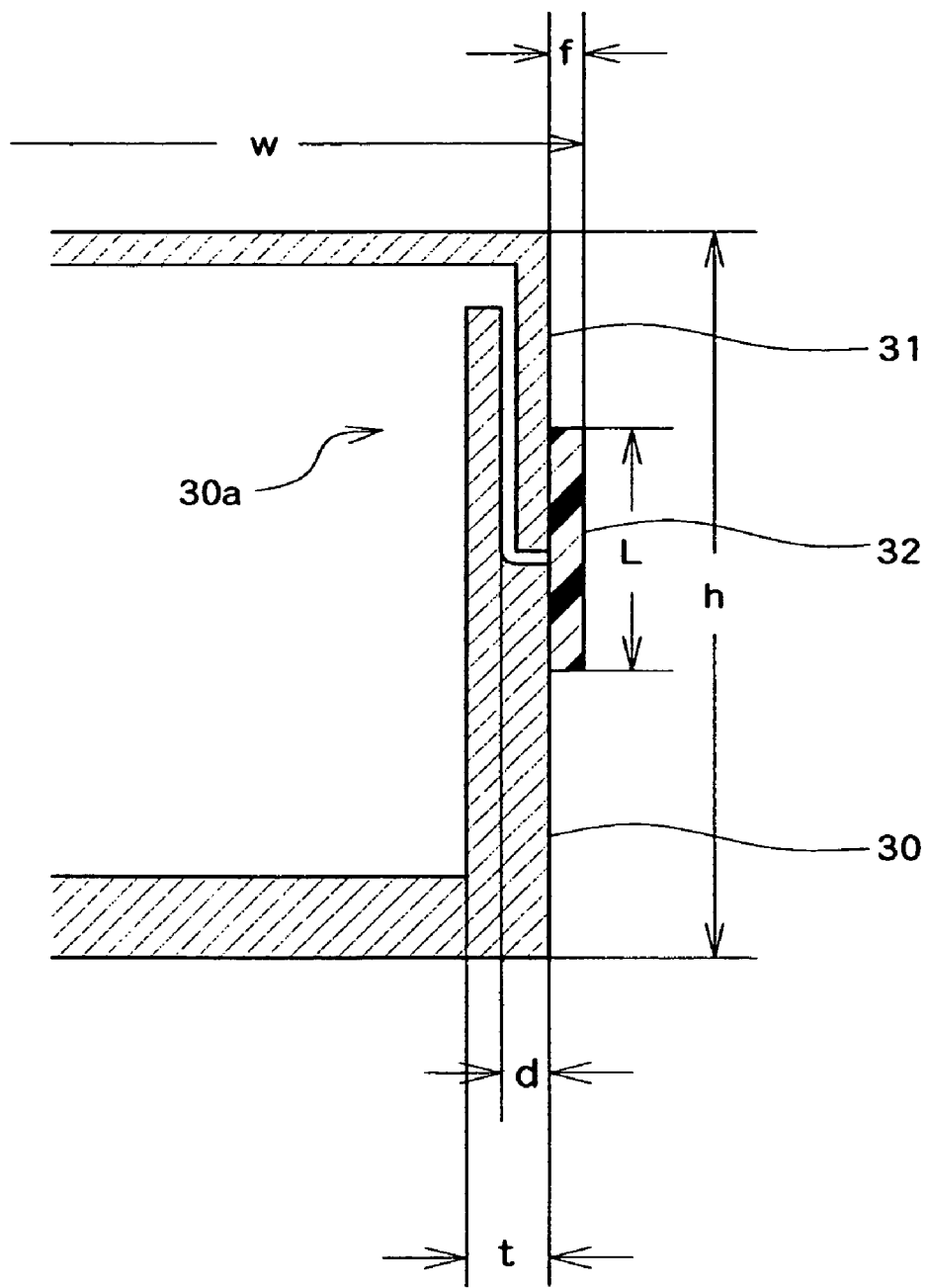
FIG. 8 is a sectional view showing an example of a case portion of the conventional magnetic disk drive.
Figure 9:
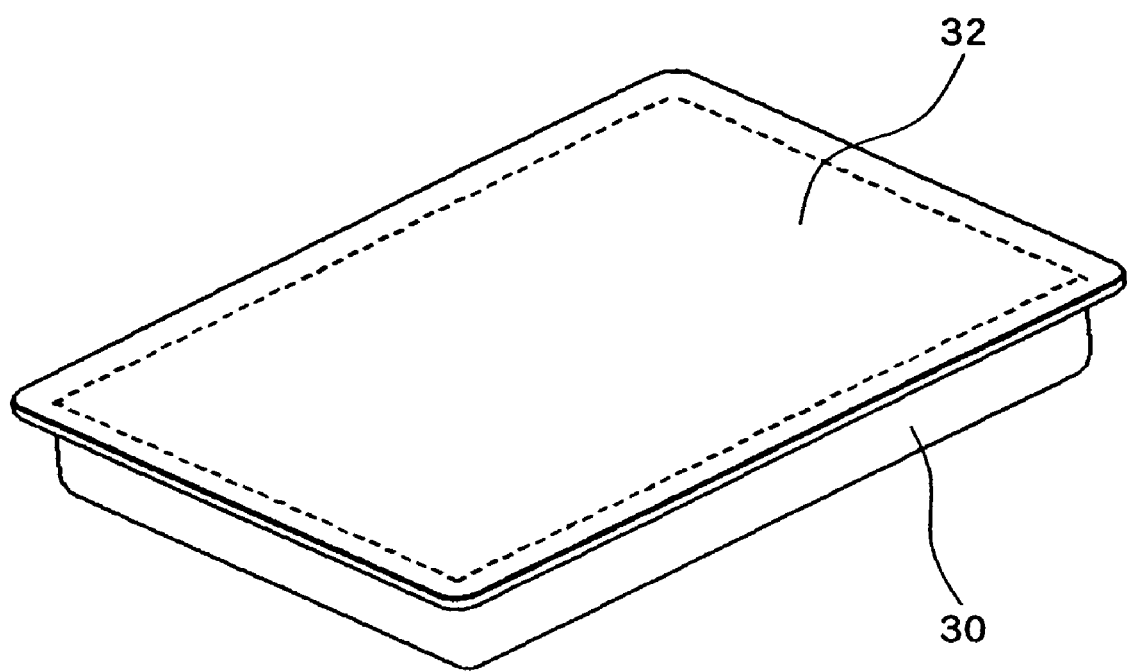
FIG. 9 is a perspective view showing another example of the conventional magnetic disk.

In this way a predetermined affixing area of the sealing member 7 can be ensured. That is, the width (d) in FIG. 8 need not be provided in the range of the side face thickness (t) of the base member 3, whereby it is possible to prevent a lowering in rigidity and strength of the base member 3, simplify the shape of the base member 3 and facilitate the manufacture of the base member 3 and the sealing member 7. Moreover, since the plate-like cover member 5 can be utilized, it does not happen that the area of the peripheral edge portion of the opening of the base member 3 may become smaller than that of the bottom of the base member due to a fitting engagement of both base member and cover member. Further, the size of the magnetic disk drive can be reduced because it is not necessary to provide a flange or the like.

Figure 4:
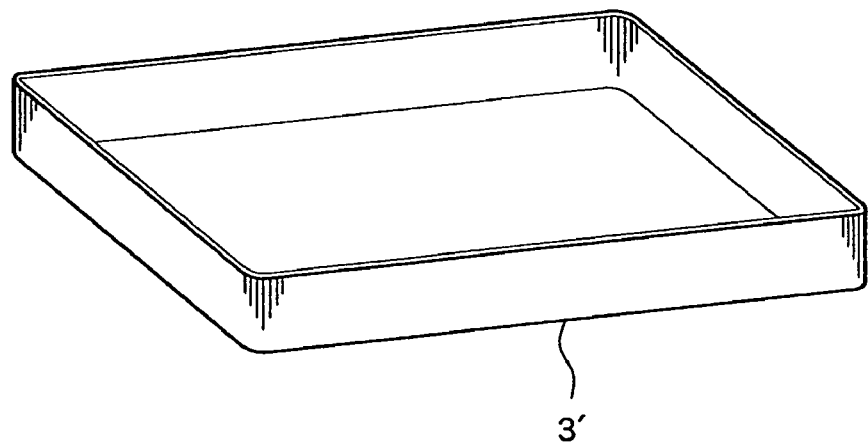
FIG. 4 is a perspective view showing another example of a base member used in the magnetic disk drive.
Figure 5:
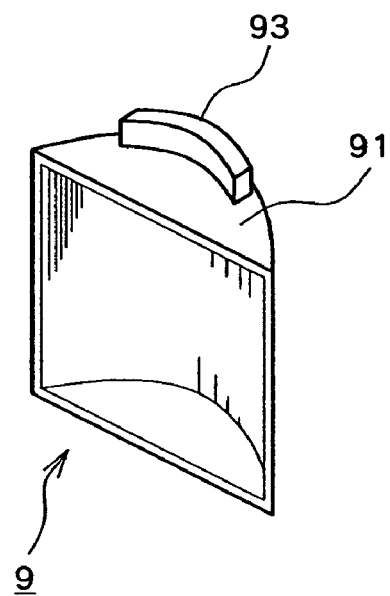
FIG. 5 is a perspective view showing an example of a support member for supporting a cover member in the magnetic disk drive.

Although reference has been made above to an example in which the base member is formed with support portions for the cover member, the cover member may be supported by using support members formed separately from the base member. In this case, a base member 3' is used in the shape of a box as shown in FIG. 4. The base member 3' is formed by sheet metal working, for example. As shown in FIG. 5, generally triangular support members 9 each have a round corner to match the shape of each corner of the base member 3' in plan view. The support members 9 are formed so that they can be fitted respectively onto the corners of the base member 3'. The body of each support member 9 may be formed by molding with use of an elastic resin or the like so that a shock which the base member receives can be cushioned through the support members 9.

Further, a protuberant portion 93 may be formed on at least one of an upper surface 91 and a bottom of each support member 9 on the side closer to the corner and along the shape of the corner. In the case where the protuberant portion 93 is formed on the bottom of each support member 9, it functions as a leg of the magnetic disk drive. On the other hand, in the case where the protuberant portion 93 is formed on the upper surface 91, it functions as a wall to prevent easy movement of the cover member 5 and inhibits the cover member 5 from moving to the outer periphery side beyond the position of the said wall.

Figure 6:
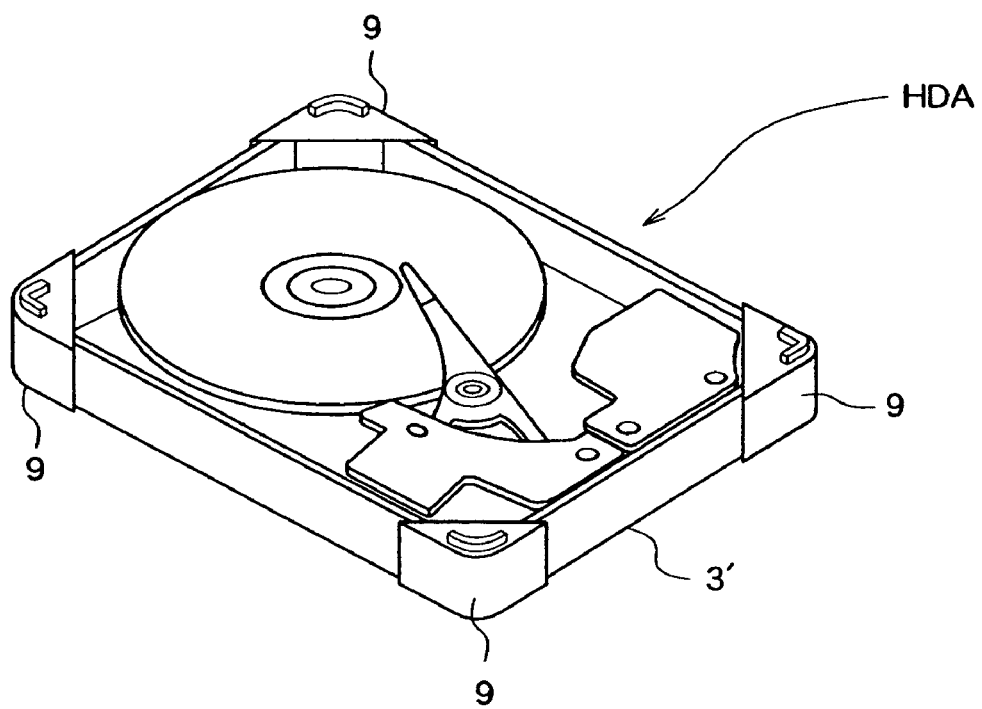
FIG. 6 is a perspective view showing another example of the magnetic disk drive.
Figure 7:
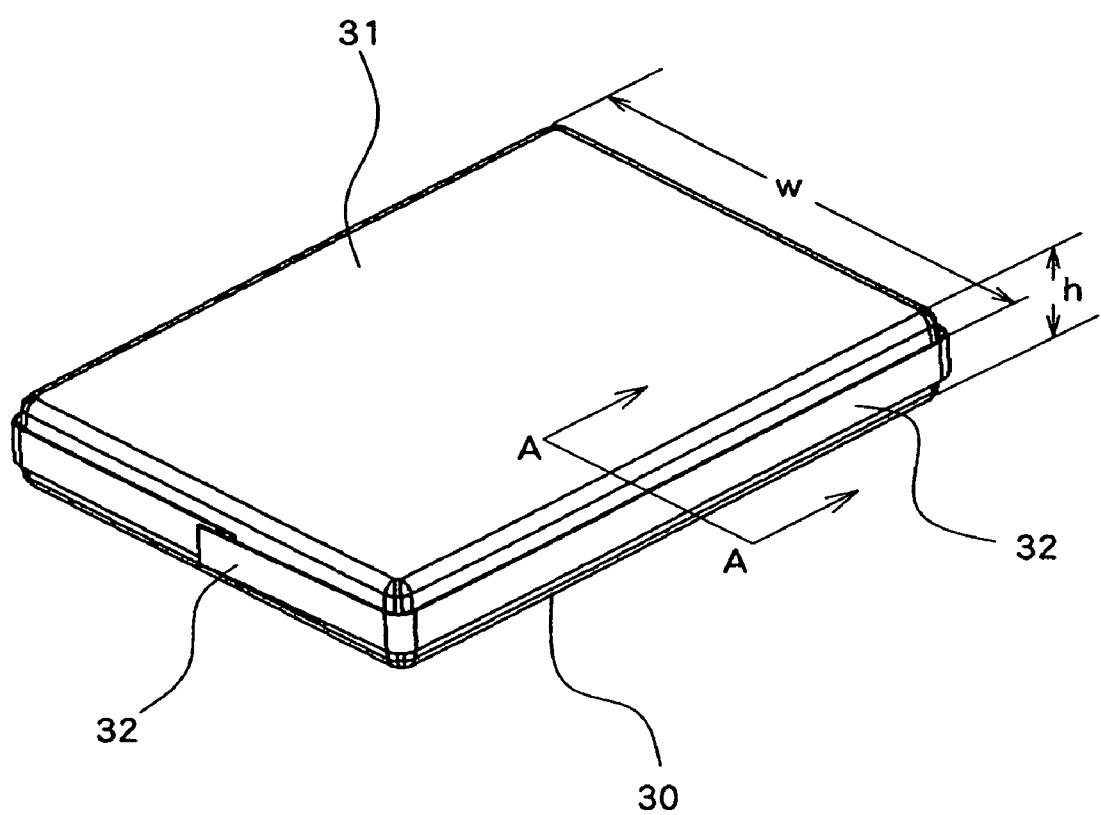
FIG. 7 is a perspective view showing an example of a conventional magnetic disk drive.

As a concrete example, a mounted state of the support members 9 to the base member 3' is shown in FIG. 6. In the illustrated example, the upper surface 91 of each support member 9 serves as a support portion for the cover member 5 and the cover member 5 is supported by the upper surfaces 91 of the support members 9.

Also in this case, sealing is made from the upper surface of the cover member 5 up to the side faces of the base member 3' by means of the sealing member 7 shown in FIG. 2.

A single or plural magnetic disk mediums, a magnetic head, a magnetic head assembly, a spindle motor, a voice coil motor and a magnetic disk assembly including a circuit section are accommodated within the illustrated case. The magnetic disk medium(s) is driven rotationally by the spindle motor to record information. The magnetic head flies over the magnetic disk medium and is driven by the voice coil motor to write or read information with respect to the magnetic disk medium. The magnetic head assembly performs positioning of the magnetic head. The circuit section is connected to a host and, in accordance with a data write command inputted from the host, the circuit section controls the voice coil motor to move the magnetic head to a position above a data write position of the magnetic disk medium, then provides a signal to the magnetic head, allowing data to be recorded magnetically onto the magnetic disk medium.

On the other hand, in accordance with a read command issued from the host side, the circuit section controls the voice coil motor to move the magnetic head to a position above a data write position of the magnetic disk medium, generates read data in response to a signal read by the magnetic head and outputs it to the host.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
 a base member having an upper surface at least a part of which is open;
 a spindle motor disposed on said base member;
 one or more magnetic disks for recording information, said one or more magnetic disks being driven rotationally by said spindle motor;
 a magnetic head configured to write and read information with respect to said magnetic disk;
 a magnetic head assembly configured to perform positioning of said magnetic head; and
 a cover member fixed to said base member to form an interior space for accommodating said spindle motor, said magnetic disk, said magnetic head and said magnetic head assembly; and
 four cover support members detachably coupled to four corners of the base member, each cover support member having an upper surface extending inwardly from one corner of the base member, the upper surface forming one support portion for supporting a portion of the cover member;

wherein a sheet-thin sealing member is affixed to an upper surface of said cover member and over side faces of said base member to seal a clearance between the base member and the cover member.

2. A magnetic disk drive according to claim 1, wherein the cover member is smaller in planar size than the base member, such that the cover member does not extend to or beyond an outer periphery of the base member.

3. A magnetic disk drive according to claim 1, wherein said base member is formed by sheet metal working.

4. A magnetic disk drive according to claim 1, wherein the at least one cover support member has an upper surface extending inwardly from an outer periphery of the base member, the upper surface forming the support portion for supporting a portion of the cover member; and
wherein the sealing member is affixed to a part of the upper surface of the at least one cover support.

5. A magnetic disk drive according to claim 1, wherein the upper surface is generally triangular in shape.

6. A magnetic disk drive according to claim 1, wherein the cover member is generally rectangular in shape with cut corners that are supported on a part of the upper surfaces of the cover support members and do not extend to outer peripheries of the cover support members at the four corners of the base member; and
wherein the sealing member is affixed to a part of the upper surface of each cover support member.

7. A magnetic disk drive according to claim 1, wherein the four corners of the base member are rounded and the cover support members are shaped to conform to the rounded corners of the base member.

8. A magnetic disk drive according to claim 1, wherein each cover support member is coupled to an exterior of one corner of the base member.

9. A magnetic disk drive according to claim 1, wherein each cover support member includes a protuberant portion on a top of the upper surface near an outer periphery thereof.

10. A magnetic disk drive according to claim 1, wherein each cover support member includes a lower surface extending inwardly from one corner of the base member, and a protuberant portion at a bottom of the lower surface near an outer periphery thereof.

11. A magnetic disk drive comprising:
a base member having an upper surface at least a part of which is open to receive a spindle motor, one or more magnetic disks, a magnetic head, and a magnetic head assembly;
a cover member fixed to the base member to form an interior space for accommodating the spindle motor, the magnetic disk, the magnetic head and the magnetic head assembly;
at least one cover support member having a support portion for supporting the cover member;
a sheet-thin sealing member affixed to an upper surface of the cover member, and over side faces of the base member to seal a clearance between the base member and the cover member; and
four cover support members detachably coupled to four corners of the base member, each cover support member having an upper surface extending inwardly from one corner of the base member, the upper surface forming one support portion for supporting a portion of the cover member.

12. A magnetic disk drive according to claim 11, wherein the cover member is generally rectangular in shape with cut corners that are supported on a part of the upper surfaces of the cover support members and do not extend to outer peripheries of the cover support members at the four corners of the base member; and
wherein the sealing member is affixed to a part of the upper surface of each cover support member.

13. A magnetic disk drive according to claim 11, wherein the sealing member is affixed to a part of the support portion of the at least one cover support member.

* * * * *